United States Patent [19]

Raymond et al.

[11] Patent Number: 4,717,816

[45] Date of Patent: Jan. 5, 1988

[54] ELECTRONIC LOCK AND KEY SYSTEM FOR HOTELS AND THE LIKE

[76] Inventors: James W. Raymond, 104 Via Lido Soud, Newport Beach, Calif. 92663; James A. Millet, 1020 W. 17th St., Costa Mesa, Calif. 92627

[21] Appl. No.: 887,937

[22] Filed: Jul. 22, 1986

Related U.S. Application Data

[63] Continuation-in-part of Ser. No. 579,648, Feb. 13, 1984, abandoned.

[51] Int. Cl.[4] .............................................. G06K 7/01

[52] U.S. Cl. ................................ 235/382.5; 235/449; 235/493; 340/825.31

[58] Field of Search .................... 340/825.31; 235/449, 235/493, 382.5, 493, 382.5

[56] References Cited

U.S. PATENT DOCUMENTS

| | | | |
|---|---|---|---|
| Re. 29,259 | 6/1977 | Sabsay | 235/382.5 |
| 3,508,227 | 4/1970 | Berezin et al. | 235/493 X |
| 3,800,284 | 3/1974 | Zucker et al. | 340/825.31 |
| 3,808,404 | 4/1974 | Riggs | 235/493 X |
| 3,906,447 | 9/1975 | Crafton | 235/382.5 |
| 4,213,039 | 7/1980 | Schasser | 235/449 |
| 4,396,914 | 8/1983 | Aston | 340/825.31 |
| 4,408,122 | 10/1983 | Casden | 235/493 X |

*Primary Examiner*—David L. Trafton
*Attorney, Agent, or Firm*—Keith D. Beecher

[57] ABSTRACT

An electronic key and lock system is provided which is particularly suited for use in hotels and motels to control access to the rooms of the establishment. The system includes a battery energized microcomputer controlled unit in each door which is capable of activating an electromechanical deadbolt mechanism when a magnetically encoded card bearing a selected code is inserted into a slot in that particular door, and which includes a non-contact proximity magnetic sensor for the cards. The microcomputer controlled unit has five levels of response, namely, guests, maid, master, grand master and emergency. In addition to responding to the selected code, the microcomputer is programmed also to respond to cards bearing a new code when a new guest inserts his card into the slot in the door, and of adjusting the unit to respond to the new code and not to the previous code. The microcomputer is capable not only of reading a magnetically encoded card inserted into the corresponding slot and of releasing the deadbolt mechanism of the door when the card bears the proper code, but it is also capable of recording the time and identity of all hotel personnel gaining access to the room, and of responding to a particular guest card only for a particular time period, corresponding to the duration of the guest's intended occupancy of the room.

19 Claims, 5 Drawing Figures

ELECTRONIC LOCK AND KEY SYSTEM FOR HOTELS AND THE LIKE

This application is a continuation-in-part of copending application Ser. No. 579,648, filed Feb. 13, 1984, now abandoned.

BACKGROUND OF THE INVENTION

The advantages of electronic lock systems over their mechanical counterparts are obvious in that the electronic lock systems offer greater protection in guarding against unauthorized entry, key duplication and lock picking. The prior art electronic lock systems, in general, include an electronic control circuit which responds to a coded card, or other coded key, to operate an electromechanical latch. The cards in the prior art systems are usually coded optically, magnetically, electrostatically, or capacitively.

U.S. Pat. No. 3,821,704 discloses an electronic lock system in which the electronic control circuit in each door can be readily changed to respond to new codes. This is an essential requirement in hotels, in order that each new guest may be issued a card bearing a new code which will be effective to open a particular door, and which will cause the card issued to the previous guest to be no longer effective in operating the door. A feature in the system described in the patent is that when the new guest inserts his card into the slot in the door of the room assigned to him, the insertion causes the unit in the door to be changed to respond to the new code encoded into the card of the new guest, and to be no longer responsive to the code encoded into the card issued to the previous guest.

As mentioned in U.S. Pat. No. 3,821,704, a requirement in adapting electronic lock systems to hotels is the necessity that the lock must be responsive to a variety of coded cards. For example, a maid must be provided with a maid's card. For security reasons, however, it is generally desirable to provide the maid with a card which will open only the rooms to which the particular maid is assigned, and no others. A supervisor may be issued a higher level master card which will open a larger number of rooms than the maid's card, corresponding to the number of rooms assigned to all maids under the supervision of the supervisor. Still higher level master cards may be issued to hotel personnel for opening all doors in a section of the hotel for maintenance purposes, or in case of fire, or other emergency. It will be seen, therefore, that the requirement of a number of levels of cards, and the recurrent need to change the individual door locks or groups of door locks to control theft, presents a substantial problem in adapting electronic lock systems to hotels.

In the electronic lock system described in the aforesaid patent, each lock is controlled by a decoding device which includes a resettable memory. In its simplest form, the memory is pre-set with a multi-bit combination. Each time a card is used in the system described in the patent, at least two numbers are entered into the system, a key number and an authorization number. If the key number is found to match the combination previously stored in the particular decoding device, the lock of the corresponding door will be activated. If such a match is not made, a comparison is then made between the authorization number on the card and an authorization number entered by the previous user. If the comparison is established, the decoding device is reset to the new key number, so that the lock may be opened by the new card. Accordingly, to change a lock combination in any particular decoding device in any particular door in the system described in the patent, all that is necessary is to encode a newly issued card with a new card number and with the last card authorization number. Then, when the new card is inserted into the particular door, the circuitry will respond to change the stored code to the new code, and to activate the electromechanical latch system to open the door.

In the system described in the patent, when a guest registers for a room, he is given a card bearing at least two fields of encoded information. One field contains the new key number, and the second field contains the authorization number assigned to the last guest to use the room. Upon the first insertion of the card by the new guest, the lock is automatically re-keyed to the new combination encoded into the new card. Thereafter, until the lock combination is again changed, the only card number that will open the particular door is that assigned to the present guest; and no prior guest cards will open the lock since the decoding circuit now contains a new code number.

Because the lock combination is stored in a memory accessible only by a particular logic circuit, electronic door locks of the type described in the patent are not susceptible to being picked. Further, each lock may be re-keyed without the intervention of anyone but the user. Finally, there is no interconnection with a central controller from the individual electronic units in the individual doors, which saves a considerable amount of installation cost.

The electronic lock system of the present invention is of the same general type as described in U.S. Pat. No. 3,821,704. However, the electronic lock system of the invention has additional features which include, inter alia, the installation in each door of a battery energized microcomputer controlled electronic circuit, and which are constructed so that units of the present invention may be installed easily and expeditiously in existing hotel doors of the type having mortise locks or having locks located in the knobs.

Each of the units of the invention mounted in the individual doors responds to a programmable magnetically coded key card which serves to activate an electronic lock circuit if the code is proper, and also to up-date the code stored in the unit if the card has been issued to a new guest. Each unit, in accordance with the concepts of the present invention, is also capable of identifying and recording the time of all entries into the room, and of limiting the number of days the card issued to any particular guest is effective.

The key cards used in the electronic lock system of the invention are magnetically encoded, and they are reprogrammable and may be used many times. Data on each card is proximity sensed by a non-contact electromagnetic read head, when the key card is inserted into a slot in any one of the electronic lock door units, so that the read head does not contact the magnetic material in the card and the problems of ambiguous data transfer due to dust, dirt, grease and the like, are eliminated, such problems being common to the prior art key card reading systems, whether magnetic strip, optical or capacitance encoding of the individual cards is used. In addition, the individual bits on the card used in the system of the invention are sufficiently loosely packed so that the information may be written into the card and read from the card by manual movement of the card without any need for drive motors or the like.

For convenience, each unit may be constructed so that the key cards may be inserted into the slot with either face up. The card may also be programmed with a guest's identity and sent to the guest when a reservation is made. Then, upon entering the hotel, the guest need merely insert his card into a card reader to complete check-in and to receive his room assignment. On check-out the guest merely inserts his card into the reader and his billing information is automatically recorded and he is provided with a print-out.

A portable computer is provided which may be hand carried to any door and plugged into the electronic control unit in that door to read identification and time data stored in the unit, and also to re-program the door unit if necessary, and to program the unit door for an initial use.

DETAILED DESCRIPTION OF THE ILLUSTRATED EMBODIMENT

Figure 2:
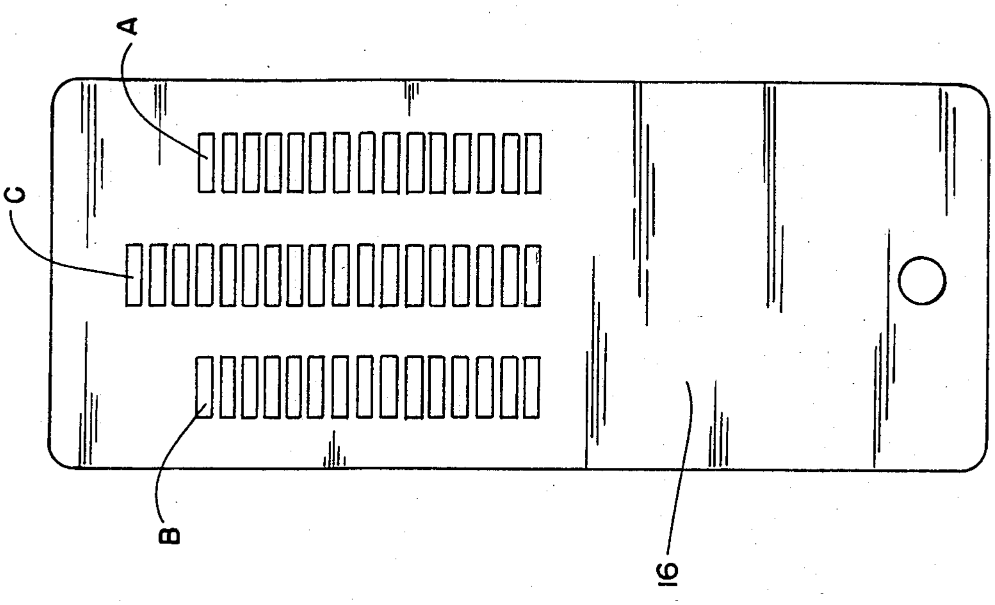
FIG. 2 shows a metallic card which when inserted into a slot in the door unit of FIG. 1 serves to unlock the door, the card being magnetically coded with any selected code by an appropriate coder located, for example, at the hotel desk.
Figure 1:
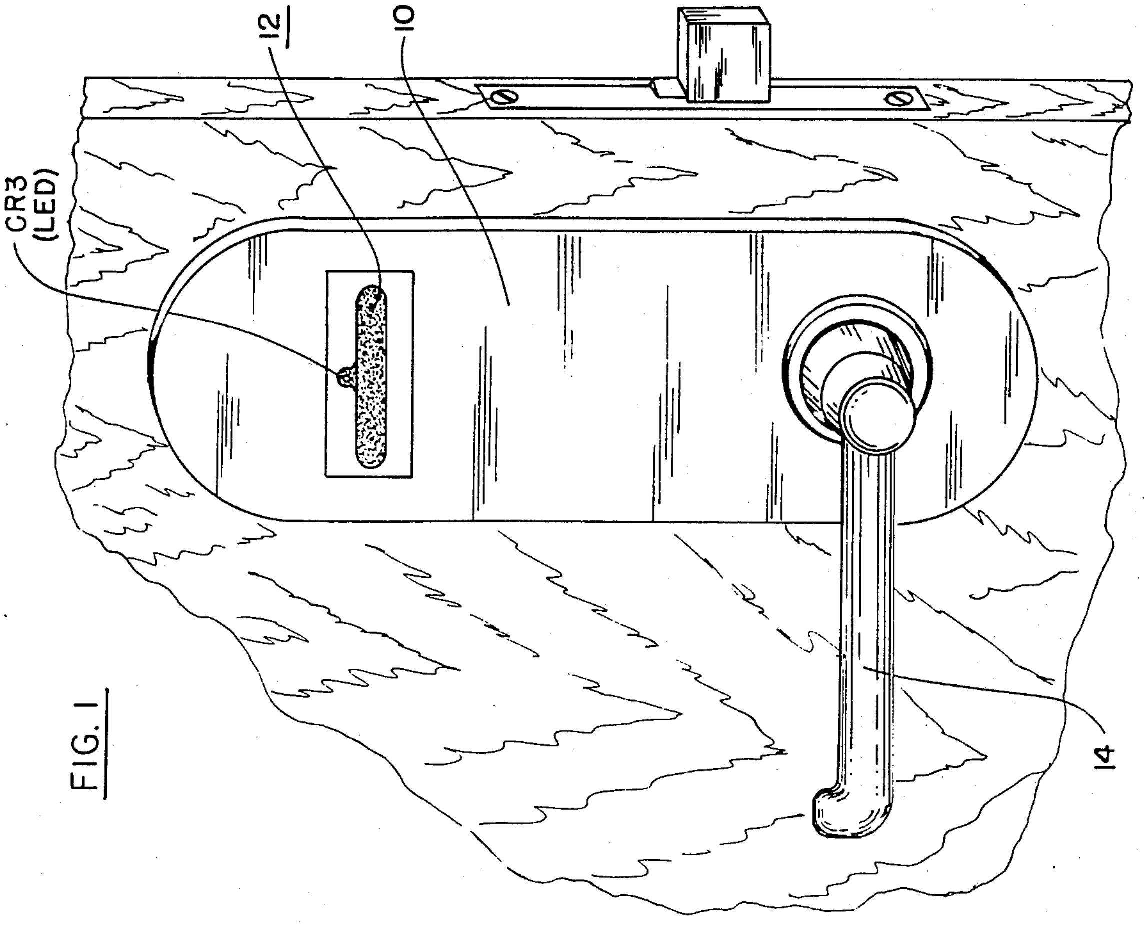
FIG. 1 is a perspective representation of a door lock unit which incorporates the concept of the present invention.

The door unit of FIG. 1 is designated 10, and it includes a slot 12 into which a magnetically encoded card 16 (FIG. 2) is inserted into the slot. When the card bears the appropriate code, the door is unlocked, and may be opened by turning a handle 14. The card 16 of FIG. 2 is formed, for example, of magnetizable material. The card includes a first series of slots designated A, a second series of slots designated B, and a third series of slots designated C. The portions of the card between the individual slots are appropriately magnetized in accordance with a binary code. The series A and B represent data bits, whereas the series C represent clock bits. The clock bit slots C may also be used with an optical reader for clocking purposes, if so desired.

The card 16 may be encoded by a computer 100 (FIG. 5) by inserting the card in a slot 102, and by operating the keyboard of the computer. Computer 100 may be a small, inexpensive, portable computer, such as an EPSON Hx-20. This computer is usually constructed to encode a magnetic tape in a cassette. The simple modification of replacing the cassette by card-receiving slot 102, enables the card to be encoded by the computer. When the card is inserted into slot 102 of FIG. 5, the central row of slots may be read optically for clocking purposes, and when the card is withdrawn the clock bits may be read magnetically.

The programmable card 16 is advantageous over optically encoded cards in that it is easily encoded without any need for a hole punching machine, it is re-usable, and it is not susceptible to counterfeiting.

Figure 3:
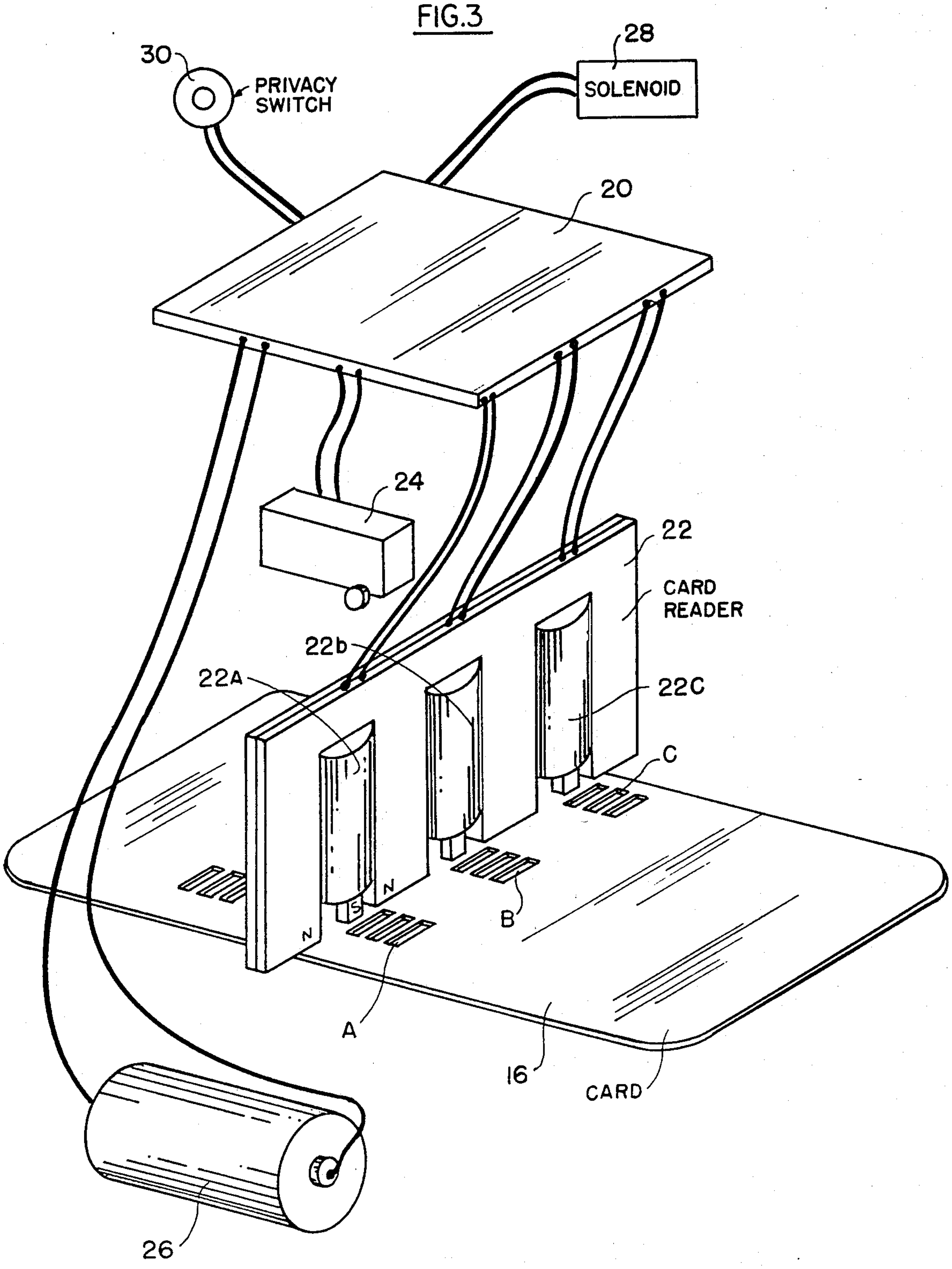
FIG. 3 is a schematic representation of the various components incorporated in the door unit of FIG. 1, including a circuit board.

As shown in FIG. 3, an electric unit is contained within the door unit 10 of FIG. 1, including a circuit board 20, a card reader 22, a switch 24, an energizing battery 26, a solenoid 28, and a privacy switch 30. The card reader 22 includes three magnetic read heads 22A, 22B, 22C. When card 16 is inserted in slot 12 (FIG. 1), the card moves under the three read heads and is moved inwardly until it actuates switch 24. Switch 24 activates the circuit, and the card is read as it is withdrawn from the slot. The three heads 22A, 22B and 22C of the card reader 22 sense the encoding between the various series of slots A, B and C on card 16. The magnetic sensing by the card reader 22 is on a proximity basis, in that the read heads 22A, 22B and 22C do not actually contact the magnetic card, so that the problems of ambiguous data transfer due to dust, dirt, grease, and the like, do not arise.

The battery 26 activates the circuitry on circuit board 20, and if the particular card 16 bears the proper code, solenoid 28 will be activated when the card is withdrawn from the slot, so that the door may be opened. Privacy switch 30 may be actuated when a person is in the room, so that the circuitry on circuit board 20 will not respond to any card inserted into the slot, except the emergency card. Battery 26 may be a 2.9 or 3.4 volt lithium battery which has a life expectancy of 20 years.

Figure 4:
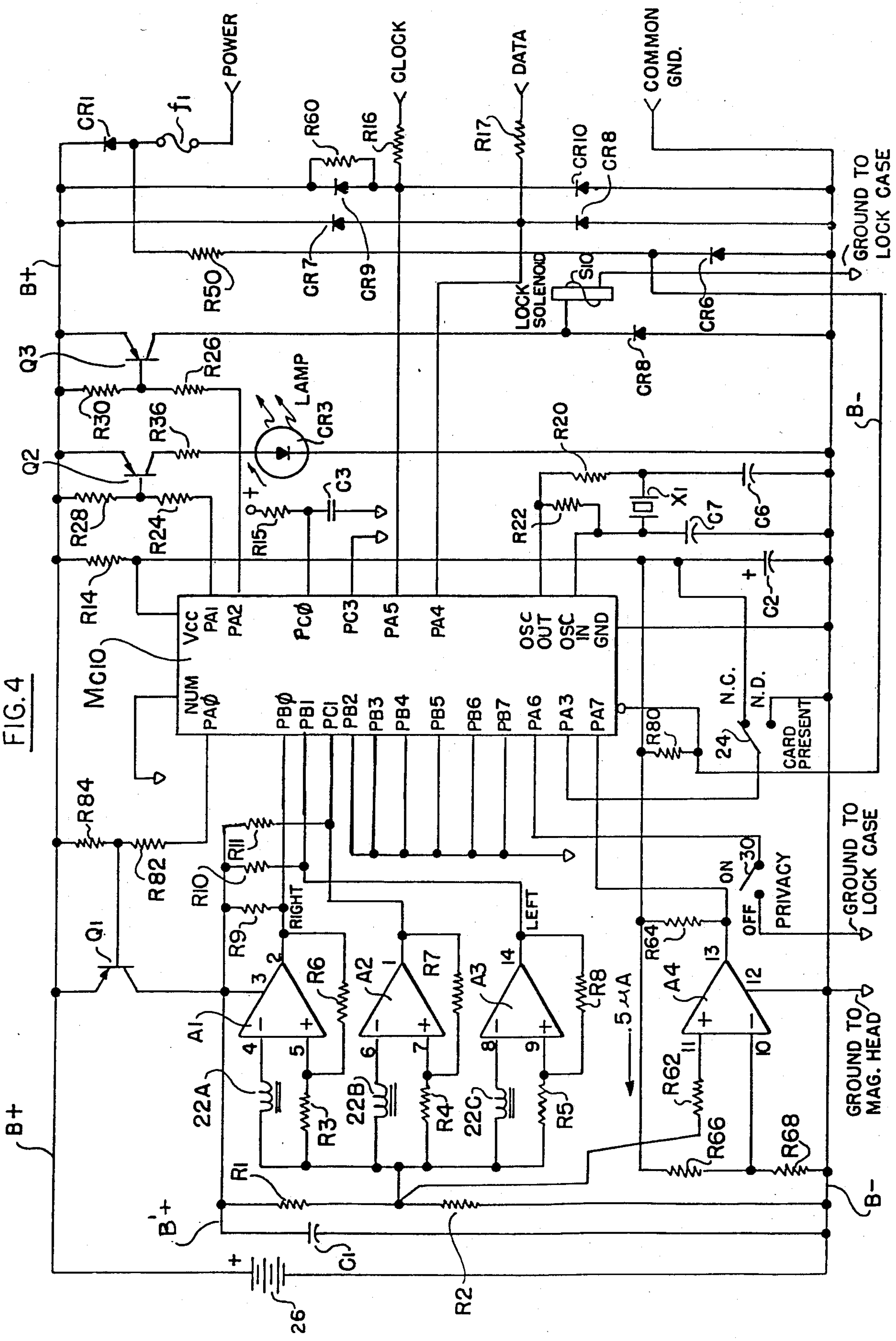
FIG. 4 is a circuit diagram of the circuitry on the circuit board of FIG. 4.

The circuit diagram of the door unit FIG. 4. As shown, the three read heads 22A, 22B and 22C which make up the card reader 22 are respectively connected to comparators A1, A2 and A3 which may be contained in an integrated circuit of the type designated LM339. The comparators A1, A2 and A3 are connected to pins PB0, PB1 and PC1 of a microcomputer MC10 which may be of the type designated MC146805F2, which is manufactued by the Motorola Company. The comparators A1 and A3 supply data bits to the microcomputer MC10, and the comparator A2 supplies clock bits.

Battery 26 has its negative terminal connected to a negative lead designated B−, and its positive terminal connected to a positive lead designated B+. The lead B+ is connected to the emitter of a transistor Q1, the collector of which is connected to a lead designated B′+. A pair of resistors R1 and R2, each having a value of 5.1 kilo-ohms, are connected in series between the lead B′+ and B−. These resistors are shunted by a 0.1 microfarad capacitor C1. The junction of resistors R1 and R2 is connected to the read heads 22A, 22B and 22C, and to a group of 5.7 kilo-ohm resistors R3, R4 and R5. The read heads are connected to the inverting inputs of the respective comparators A1, A2 and A3, and the resistors R3, R4 and R5 are connected to the non-inverting inputs of the comparators. A group of 1 meg-ohm resistors R6, R7 and R8 connect the respective output terminals of the comparators to the corresponding non-inverting input terminals. The lead B′+ is connected to the comparators to excite the comparators, and is also connected through respective 100 kilo-ohm resistors R9, R10 and R11 to pins PB0, PB1 and PC1 of microcomputer MC10. Pins PB2, PB3, PB4, PB5, PB6 and PB7 of the microcomputer are grounded.

The privacy switch 30 is connected to lock case ground, and to pin PA6 of the microcomputer MC10. Lead B−, on the other hand, is connected to magnetic head ground.

The card switch 24 has its armature connected to pin PA3 of the microcomputer, and a normally open terminal connected to lead B−, and a normally closed terminal connected to a 5 microfarad capacitor C2 and through a 5.1 kilo-ohm resistor R14 to lead B+. Resistor R14 is also connected to pin $V_{CC}$ of the microcomputer, and capacitor C2 is connected to lead B−. Card switch 24 is actuated to one position when the card is fully inserted in the slot 12, and it is actuated to its second position when the card is withdrawn from the slot. The microcomputer MC10 produces the access output at PA2 a predetermined time after the switch 24 has been actuated to its first position by the full insertion of the card into the slot, and then returned to its second position by the withdrawal of the card. The circuit is activated when the card is fully inserted, and the card is read as it is withdrawn.

Pin PC0 of the microcomputer is connected to the junction of a grounded capacitor C3 and resistor R15, the resistor being connected to the positive terminal of voltage source 26. Pin PA5 is connected to a clock terminal through a 100 kiloohm resistor R16. Pin PA4 is connected to a data terminal through a 100 kilo-ohm resistor R17. Lead B− is connected to a common ground terminal, as shown. Lead B+, on the hand, is connected through a diode CR1 of the type designated IN4007, and through a fuse f1 to a power terminal.

Figure 5:
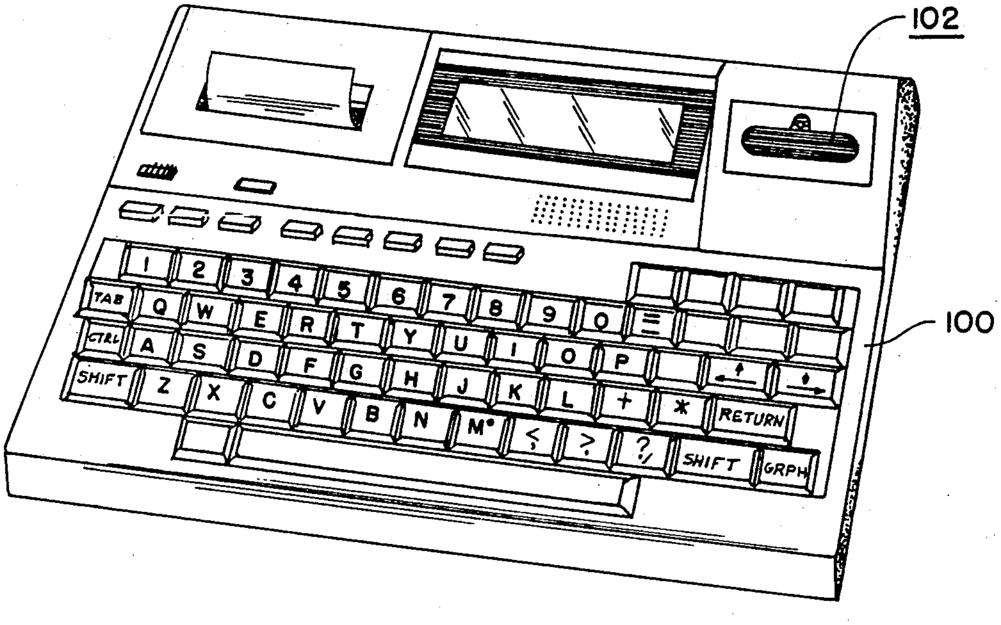
FIG. 5 is a representation of a portable computer which is used to encode the card of FIG. 2, and which may be used to read data stored in the individual door units, and to program the door units for original use.

The computer 100 is shown in FIG. 5, may normally be kept at the desk of the hotel, or other facility, and is used to code the guest cards, as each guest checks into the hotel. This being achieved by inserting a blank card into a slot 102, and then creating an appropriate code on the card by operation of the keys of the computer.

Computer 100 may be carried to the individual doors, and then connected to the terminals described above to read identification and time date stored in the unit; and also to supply power, clock signals, data and a ground connection to the circuitry of FIG. 4 for originally programming the microcomputer MC10, or for re-programming the microcomputer in the event of a synchronization failure, or for opening the door in the event of battery failure.

A pin designated "OSC out" is connected to a 470 kilo-ohm resistor R20 and to a 22 megohm resistor R22, resistor R20 being connected to a grounded 22 picofarad capacitor C6, and resistor R22 being connected to a pin designated "OSC in" of microcomputer MC10 and to a 70 picofarad grounded capacitor C7. A 32.768 KHz crystal X1 is connected between the common junctions of resistor R22, capacitor C7 and resistor R20, capacitor C6.

Pin PA1 of microcomputer MC10 is connected to a 10 kilo-ohm resistor R24, and pin PA2 is connected to a 1 kilo-ohm resistor R26. These resistors are connected through respective 5.1 kilo-ohm resistors R28 and R30 to lead B+.

The common junction of resistors R24 and R28 is connected to the base of a PNP transistor Q2, and the common junction of resistors R30 and R26 is connected to the base of a PNP driver transistor Q3. The emitters of the transistors Q2 and Q3 are connected to the lead B+. The collector of transistor Q2 is connected through a 100 ohm resistor R36 to LED CR3, which is also connected to lead B−. The collector of transistor Q3, on the other hand, is connected to the lock solenoid S10 which may, for example, be composed of 300 turns of No. 39 wire, and to diode CR8 which is connected to lead B−. The other side of the lock solenoid S10 is connected to the lock casing.

The junction of fuse f1 and diode CR1 is connected to a 10 kilo-ohm resistor R50 which, in turn, is connected to a diode CR6, the diode being connected to lead B−. The lead B+ is connected through a diode CR7 to pin PA4 of the microcomputer and through a diode CR8 to the B− lead. Lead B+ is also connected through a diode CR9, and through a further diode CR10 to the B− lead, the junction of the latter diodes being connected to pin PA5 of the microcomputer. The diodes CR7, CR8, CR9 and CR10 may be of the type designated 1N4148. Diode CR9 is shunted by a 4.7 megohm resistor R60.

The junction of resistors R1 and R2 is connected through a 1 megohm resistor R62 to the non-inverting input of a comparator A4 which may also be included in the integrated circuit containing comparators A1, A2 and A3. The output terminal of the comparator A4 is connected to pin PA7 of microcomputer MC10, and through a 100 kilo-ohm resistor R64 to the junction of resistor R14 and capacitor C2. Resistor R64 is also connected back through a 4.7 megohm resistor R66 to the inverting input of comparator A4, and to a 2.2 megohm resistor R68 which is connected to the B− lead. Resistor R64 is also connected through a 100 kilo-ohm resistor R80 to the junction of resistor R50 and diode CR6.

The pin PA0 of the microcomputer is connected through a 10 kilo-ohm resistor R82 to the base of transistor Q1, and through a 5.1 kilo-ohm resistor R84 to the lead B+.

The transistor Q1 is normally non-conductive, so that there is no significant drain on the battery 26 when the circuit of FIG. 4 is not in use. When the card 16 of FIG. 2 is inserted into slot 12 of FIG. 1, the card switch 24 closes, and this causes the microcomputer MC10 to render the transistor Q1 conductive, thereby energizing the system. The transistor Q1 remains conductive while the card is being withdrawn from the slot, and until all the bits on the card have been read, after which the transistor Q1 again becomes non-conductive.

So long as the circuit is activated, the transistor Q2 is intermittently energized, and causes the LED CR3 to flash. The flashing continues, for example, for 5 seconds. If the proper code is on the card, the pin PA2 of the microcomputer causes the driver transistor Q3 to become conductive, thereby energizing solenoid S10 to unlock the door. The door must then be opened during the 5 seconds while the LED CR3 is flashing. At the end of 5 seconds, the transistor Q3 is again rendered non-conductive, de-energizing the solenoid.

When the privacy switch 30 is closed, lead B'+ is grounded, and the circuit is ineffective to unlock the door, even if a properly coded card is inserted into slot 12 of FIG. 1.

As described in conjunction with FIG. 2, the rows A and B of the magnetic card 16 represent the data bits, and the center row C represents the clock bits. Accordingly, of the total bits which represent the data code, a certain number are used for the entry code, and the remaining bits are used for an identification code.

The microcomputer MC10 responds to the entry code on the card to make a comparison with the code stored in its memory, and if a comparison is achieved, causes the transistor Q3 to be rendered conductive so as to energize the door unlocking solenoid S10. The microcomputer also responds to the identification code bits to store in its memory, identification data including information relating to the time of each entry, and whether the key used was a service key, a maid's key, or a guest's key.

Specifically, the microcomputer 10 stores five levels of key codes in a constructed embodiment of the invention. The first level responds to the insertion of a guest card in slot 12 of FIG. 1; the second level responds to the insertion of a maid's card in the slot; the third level responds to the insertion of a master card in the slot of FIG. 1; a fourth level which responds to the insertion of a grand master card in the slot; and a fifth level responds to the insertion of an emergency card into the slot. The microcomputer MC10 also stores a sixth level of key code which corresponds to an access code for the computer 100 of FIG. 5 when the computer is carried to the door and plugged into the circuit of FIG. 4.

With respect to the guest level, each new guest is issued a card, and his card will activate but a single door. With respect to the maid level, each maid is issued a card, and her card will activate a predetermined number of doors when the privacy switch has not been activated. The master level cards will, for example, activate all the doors to permit servicing unless the privacy switch has been activated; whereas the emergency level cards will activate the doors even though the privacy switch 30 has been activated, in order to gain access to the room under all conditions.

The use of magnetic armature cards means that the cards may be reprogrammed and used many times, which reduces card cost, as compared with the single use card. The data on the card is proximity sensed, as mentioned above, eliminating the need for the reader heads to touch the card which, as mentioned, eliminates the problems of ambiguous data transfer due to dust, dirt, grease, and the other environmental problems common to electronic readers, whether magnetic strip, optical or capacitance.

As will be descibed, when a new guest is issued a card for a particular room, the code on his card is stepped by one or two on the binary scale, as compared with the previous card. Then, when the new guest inserts his card into the slot, the door unit responds to his card to unlock the door, and at the same time sets a register in the microcomputer 10 so that the system will no longer respond to the preceding card. Even though the change of code from one card to the next in the constructed embodiment of the system is "1" or "2" on the binary scale, unauthorized entry can still be prevented by providing no indication on the card as to the position of the most significant bit or of the other bits of lesser significance.

As mentioned above, the microcomputer 10 will read the card and record the time and identity of each person entering the room, for example, for the last fourteen entries. Specifically, the microcomputer will indicate whether the person entering the room was a guest, a maid, service personnel or emergency personnel. In the case of hotel personnel, each is identified, because of identification data recorded on their cards. By being able to read the card and record the last fourteen entries, the list of suspects of any burglary, or the like, is narrowed, which acts as a significant deterent to prevent burglary by hotel employees. As mentioned above, the identification and time data is read from each unit by the computer of FIG. 5.

The fact that the code chance on the successive cards is in accordance with a predetermined binary count, obviates any need for any communication between the card coding mechanism at the main desk of the hotel, and the various door units. Whenever a new card is to be issued to a guest, for example, it is merely necessary to insert a blank card into slot 102 of computer 100 (FIG. 5) at the main desk, and to encode the card with the current binary code corresponding to a particular room, increased by one or more on a binary scale, and there is no need to synchronize with a random coding sequence, or pseudo-random coding sequence, at the door unit as is the case, for example, in the system of U.S. Pat. No. 3,800,284.

When the new card is inserted into slot 12 of FIG. 1, the door unit will read the new code on the card and change the current code by one or more on the binary scale so that the old card will no longer be accepted. Provision may be made for the situation in which a card is issued for a particular room which is not used, so that the unit in the door does not have the opportunity of up-dating the current code. This is achieved by causing the system in the door to accept the current code, the current code plus 1 binary unit, and the current code plus 2 binary units. Therefore, even though the current code has not been up-dated by the previously issued card, it will still accept the new card.

As mentioned above, computer 100 of FIG. 5 is preferably small and portable so that it can be carried to the individual doors when the occasion arises and plugged into the individual door units. The microcomputer unit MC10 in each door unit has a small memory which stores data as to the identies and times of the last fourteen entries into the room. The computer can be plugged into the door unit to read out this information. Also, as mentioned above, the computer can be used to program or re-program the door unit.

Lithium batteries do not gradually lose potential when they begin to fail. Instead, the potential immediately drops to zero. For that reason, a battery indicator circuit is included in the system of FIG. 3. This circuit includes capacitor C2 which is charged through resistor R14 by the battery 26. The resulting voltage across the capacitor powers the microcomputer MC10.

The internal resistance of the battery 26 increases as it begins to fail. Therefore, its voltage will drop when failure is imminent during the time it is loaded by solenoid S10.

Comparator A4 is used to look at the voltage of battery 26 when it is supplying current to solenoid S10. If that voltage drops below a certain threshold, the code register in the memory of the microcomputer MC10 is set to zero and the door unit will not accept any code. Then, when computer 100 is plugged into the system it can open the door.

Microcomputer MC10 is initially programmed by computer to respond to a selected code. Then when a card bearing that code is inserted into slot 12 of FIG. 1, the microcomputer will cause solenoid S10 to be energizd to unlock the door.

In order to preserve power, the solenoid S10 is first energized by a 50 millisecond D.C. pulse to cause it to latch; thereafter a 1 KHz square wave with a 50% duty cycle appears at pin PA2 for five seconds to hold the solenoid latched. The solenoid obviously draws less current from battery 26 during the square wave as compared with the duration of the intiial D.C. pulse.

Microcomputer MC10 also responds to a second selected code on the card representing the previous code, incremented, for example, by 1 or 2, as mentioned above. If the next guest inserts his card into slot 12, and if the entrance code on his card corresponds to the previous code incremented by 1 or 2, microcomputer MC10 causes lock solenoid S10 to be energized so that the door may now be opened. The microcomputer will now respond to the new code, and increments of 1 or 2 to open the door, but it will no longer respond to the previous code.

Each guest card has a second code encoded on his card representing the duration of his authorized occupancy of the room. As he inserts his card into slot 12, microcomputer MC10 responds to this second code to establish a time interval after which the card is no longer effective.

Computer MC10 is also programmed to respond to a maid's particular code. When a maid's card is inserted into slot 12 of FIG. 1, having a code matching the particular code, lock solenoid S10 is energized and the door may be opened. Each maid's card also has an identity code which identifies the holder. This code is stored in the computer's memory, together with the time of access. The microcomputer MC10, however, will not respond to the maid's card if the privacy switch 30 is closed. Also, the computer will respond to a maid's card bearing the particular code incremented by 1; and it will then set itself to be no longer responsive to the previous code. This permits the maid's card to be changed whenever desired.

The microcomputer MC10 is also programmed to respond to the master cards, and to the emergency card. As noted above, the properly coded emergency card will operate the lock solenoid 10, even though the privacy switch 30 is closed. As was the case with the guest's card and the maid's card, the computer will also respond to the particular code on the master and emergency cards incremented by 1, so that these latter cards may also be changed.

The identities stored in the memory of computer MC10, and times of access, can be read by plugging computer 100 of FIG. 5 into the circuit of FIG. 4.

The microcomputer MC10 includes a clock generator controlled by crystal X1, and counting circuitry for indicating real time, so that the time of the various entries can also be stored in its memory. The unit in the door records every entry into the room on an elapsed time basis. When the computer 100 is plugged into the circuit of FIG. 4, the computer responds to the elapsed time readings of the door unit to provide a read-out of the real time of each entry.

The invention provides, therefore, an electronic lock system in which each door has its own self-contained microcomputer controlled unit which is not wired to a central computer, and which is battery operated by a self-contained battery. The unit is small and light, and it may be readily removed from the door and replaced as a single unit, should the need arise.

The system of the invention is conceived so that the individual guest cards can be programmed to expire after a selected time interval. Also, non-use of any issued guest card will not affect the operation of the system. In addition, the individual door units keep a record of the identities of all hotel personnel entering the corresponding room, and the times of each access. Accordingly, the control systems in the individual doors may be kept in synchronism with the front desk computer ina simple and expeditious manner.

The desk computer electronically codes each guest card as it is issued, and it eliminates mechanical card punches. The card itself is a simple, programmable metal card which is magnetically encoded and which is read on a proximity basis with no moving parts in the reader. The card can be re programmed and re-used countless times. The card cannot be duplicated on an unauthorized basis.

The desk computer is small and light and readily portable. It can be carried to any particular door and plugged into the door unit, as described above, to read information stored in the door unit, and to start up the door unit.

It will be appreciated that while a particular embodiment of the invention has been shown and described, modifications may be made. It is intended in the claims to cover all modifications that come within the true spirit and scope of the invention.

We claim:

1. An electronic lock control system to be mounted in a door including: microcomputer means having means for storing a predetermined multi-bit binary number access code; a first key member having multi-bit binary data stored thereon corresponding to an access code; key reading means connected to said microcomputer means for reading the binary data stored on said key member and for introducing inputs corresponding to such data into said microcomputer, said microcomputer responding to a match between the access code of said key member and the binary data access code stored therein for producing an access output, and said microcomputer also responding to a match between the access code of a second key member and a predetermined constant increment of the binary data stored in said code microcomputer for producing said access output; means connected to said microcomputer and responsive to said access output to unlock the door; and said microcomputer responding to a match between said access code stored on said second key member and said predetermined increment of the binary data stored in said microcomputer for rendering the microcomputer unresponsive to the access code on said first key member.

2. The combination defined in claim 1, in which said predetermined constant increment is of the order of 1.

3. The combination defined in claim 1, in which said predetermined constant increment is of the order of 1 or 2.

4. The combination defined in claim 1, in which said key member is formed of magnetizable material capable of being magnetized to represent any selected multi-bit binary number, and being capable of being remagnetized to represent other multi-bit binary numbers.

5. The combination defined in claim 1, in which said key member is formed entirely of material capable of being magnetized and is configured as a flat rectangular-shaped card having a plurality of aligned slots therein, with the portions of the card between the slots being susceptible to being magnetized to represent the binary bits of a selected binary coded number.

6. The combination defined in claim 4, in which said key member is magnetized to cause said key reading means to generate electric signals corresponding to the binary data stored on said key member and also to generate corresponding clock signals when said key member is read by said key reading means.

7. The combination defined in claim 4, in which said key reading means includes at least one electromagnetic read head for proximity reading the data stored o said key member.

8. The combination defined in claim 1, and which includes a privacy switch connected to said microcomputer means and operable from the interior of the door to prevent said microcomputer means from producing said access signal when the privacy switch is set to a particular position.

9. The combination defined in claim 1, and which includes receiving means for said key member; a switch mounted in said key receiving means to be actuated to a first position when said key member is inserted in said key receiving means, and which is actuated to a second position when the key is withdrawn from said key receiving means, and circuitry connected to said switch and to said microcomputer for causing the microcomputer to produce said access output a predetermined time interval after the switch has been actuated to its first position and returned to its second position by the insertion and withdrawal of the key member in and from said key receiving means.

10. The combination defined in claim 1, and which includes a battery included in said unit and connected to said card reading means and to said microcomputer to constitute the sole source of energy therefor.

11. The combination defined in claim 10, and which includes receiving means for said key member, a switch mounted in said key receiving means to be actuated when said key member is inserted into said key receiving means, and a circuit connected to said switch and to said battery for testing the state of said battery each time said key member is inserted into said key reeiving means.

12. A key member comprising a magnetic card formed entirely of a material capable of being magnetized, in which the magnetic card is in the form of a flat planar card having a plurality of aligned slots therein in side-by-side relationship, the portions of the card between the slots being susceptible to being magnetized to represent the binary bits of a selected binary coded number.

13. The combination defined in claim 12, in which the portions of the magnetic cards between the slots may be remagnetized to represent other binary coded numbers.

14. The key member defined in claim 12, in which the magnetic card is magnetized to represent a plurality of data bits, and a plurality of clock bits corresponding to said data bits.

15. The combination defined in claim 1, in which said key member has multi-bit binary data stored thereon corresponding to an identification code, and in which said microcomputer means includes means for storing multi-bit binary data corresponding to the identificaton code of the person using the key.

16. The combination defined in claim 15, in which said microcomputer means includes an internal clock for causing data representing corresponding times to be stored in said memory with said identification code.

17. The combination defined in claim 1, in which said key member has multi-bit binary data stored thereon corresponding to a duration code, and in which said microcomputer means responds to said duration code to be unresponsive to the access code of said key member after a predetermined time represented by said duration code has expired.

18. The combination defined in claim 1, in which said microcomputer produces said access output initially in the form of a pulse of a first predetermined duration followed by a signal of a selected duty cycle for a second predetermined duration.

19. The key member defined in claim 12, in which certain of the slots correspond to binary bits and certain of the slots correspond to clock bits, and in which the slots corresponding to the clock bits are also susceptible to being read optically.

* * * * *